(12) United States Patent
Zhu

(10) Patent No.: US 6,327,064 B1
(45) Date of Patent: Dec. 4, 2001

(54) FREQUENCY STABILIZED AND CROSSTALK-FREE SIGNAL SOURCES FOR OPTICAL COMMUNICATION SYSTEMS

(75) Inventor: Daniel Xiaoxing Zhu, Millersville, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/049,389

(22) Filed: Mar. 27, 1998

(51) Int. Cl.[7] ..................................... H04B 10/04
(52) U.S. Cl. ......................... 359/187; 359/188; 359/161; 359/110; 359/173; 372/32; 372/34; 372/38; 385/37
(58) Field of Search ..................... 359/187, 188, 359/161, 110, 173; 372/32, 34, 38; 385/37

(56) References Cited

U.S. PATENT DOCUMENTS

| | | | |
|---|---|---|---|
| 5,077,816 | 12/1991 | Glomb et al. | 385/37 |
| 5,299,212 | * 3/1994 | Koch et al. | 372/32 |
| 5,384,550 | * 1/1995 | Henely et al. | 331/17 |
| 5,696,859 | 12/1997 | Onaka et al. | 385/24 |
| 5,875,273 | * 2/1999 | Mizrahi et al. | 385/37 |
| 5,917,179 | * 6/1999 | Yao | 250/227.11 |
| 5,943,152 | * 8/1999 | Mizrahi et al. | 359/187 |
| 5,982,963 | * 11/1999 | Feng et al. | 385/37 |
| 6,024,455 | * 2/2000 | O'Neil et al. | 359/530 |
| 6,067,181 | * 5/2000 | Mizrahi | 359/187 |
| 6,134,253 | * 10/2000 | Munks et al. | 372/38 |

OTHER PUBLICATIONS

McCadams, et al., "Increase in Semiconductor Laser Modulation Response to FM to AM Conversion in Transmission Through Fiber Grating", CLEO'97, Paper CThW6, pp. 447–448. No month.

Woodward, et al., "Wavelength Stabilization of a DBR Laser Using a In–Fiber Bragg Filter", IEEE Photonics Technology Letters, vol. 5, No. 6, 6/93, pp. 628–630.

Lee, et al., "Reduction of Chirping Penalty in Directly Modulated Multigigabit Transmission Systems by Spectral Filtering", CLEO'95, Paper Ctu10, pp. 93–94. No month.

Morton, et al., "High–speed, Low Chirp, Directly Modulated 1.55-$\mu$m DFB Laser Sources for 10 Gbit/s Local Distribution", OFC'96 Technical Digest, Paper TuH6, pp. 39–40. No month.

* cited by examiner

Primary Examiner—Leslie Pascal
Assistant Examiner—Hanh Phan
(74) Attorney, Agent, or Firm—Daniel N. Daisak; David L. Soltz; Michael R. Cammarata

(57) ABSTRACT

A simple and cost effective optical device is provided which locks the wavelength output of a laser transmitter in an optical transmission system as well as substantially reducing and/or eliminating signal crosstalk. A light source is coupled along an optical path to a filtering element. The light source has output frequency shifts based on variation in input current. The filtering element is configured with a reflectivity characteristic which corresponds to a first portion of the optical signal associated with one or more frequencies such that the reflectivity characteristic is greater than the output frequency variations associated with the light source.

8 Claims, 4 Drawing Sheets

FREQUENCY STABILIZED AND CROSSTALK-FREE SIGNAL SOURCES FOR OPTICAL COMMUNICATION SYSTEMS

FIELD OF INVENTION

The present invention generally relates to optical communication systems and more particularly to an apparatus for providing frequency stabilized and crosstalk-free optical transmitters.

BACKGROUND OF INVENTION

Wavelength division multiplexing (WDM) is a technique for increasing the capacity of existing fiber optic networks by transmitting a plurality of channels over a single waveguide medium. WDM systems typically include a plurality of transmitters for transmitting modulated information signals on a designated one of a plurality of optical channels or wavelengths. The channels are combined by a multiplexer at a first terminal and transmitted to a demultiplexer at a receiving terminal along a transmission fiber. One or more amplifiers may be positioned along the transmission fiber to optically amplify the transmitted signals. The demultiplexer separates the optical channels and supplies them to receiving circuitry which converts the optical signals into electrical signals for processing. Dense WDM (DWDM) systems are also employed with this same general construction, but have a greater number of optical channels, typically with smaller channel spacings.

The transmitters used in WDM systems typically include semiconductor lasers each transmitting on a designated one of a plurality of wavelengths. The selected wavelengths are usually within the 1.55 $\mu$m range which corresponds to an absorption minimum associated with silica-based fibers. The output signal of each laser is controlled by an associated drive current and thermoelectric cooler (TEC) such that the transmitter output is locked to a particular channel wavelength and modulated with communication information either directly or externally. However, these lasers have associated frequency instabilities induced, for example, by temperature and/or injection current variations which may cause crosstalk problems between channels.

As mentioned above, the lasing frequency of semiconductor lasers changes with injection currents. This is due to the band-filling effect, junction heating effect and refractive index variations associated with each laser. Where distributed feedback (DFB) lasers are used as the source in these types of WDM systems, the heating effect is most problematic because as the input current increases the frequency of the output is red-shifted. This is more clearly illustrated with reference to FIG. 1 which is a plot of the frequency variation of an exemplary DFB laser as a function of bias current at a temperature of 25° C. When the current increases from a threshold value $I_{th}$, for example 13.8 mA, to a desired operating current $I_0$, for example 45 mA, at an output power of 2.5 mW, the output frequency of the laser will decrease by approximately 58 GHz. Since the transmitted wavelengths in a WDM and dense WDM systems are relatively close to each other, e.g. channel spacings in the 50 GHz range, this frequency shift can be larger than the channel spacings, thereby causing crosstalk problems and corrupting the transmitted communication signals. It should be noted that the values provided above are exemplary and the frequency shifts are device dependent.

It is known that one way to solve this laser frequency stabilization problem is to employ a narrow band fiber grating which functions as a laser cavity mirror. However a drawback with this technique is that it requires a very low reflectivity (e.g. in the order of $\leq 10^{-4}$) on one facet of the laser diode. The quality of the antireflective coating is therefore extremely critical and long-term reliability has not yet been demonstrated with this technique.

Thus, there is a need to provide a simple and cost effective optical device which locks the wavelength output of a laser transmitter in an optical transmission system.

SUMMARY OF INVENTION

The present invention meets these needs and avoids the above-referenced drawbacks by providing an optical device to stabilize the output frequency of a laser transmitter and substantially reducing and/or eliminating signal crosstalk. The optical device in accordance with the present invention includes a light source for generating a light signal at a particular frequency. The light source is capable of outputting frequency shifts based on variations in input current. A filtering element is also included which is coupled to the light source along an optical path. The filtering element is configured to have transmissivity and reflectivity characteristics as a function of frequency. The reflectivity characteristic corresponds to a first portion of the light signal associated with one or more frequencies outside of the particular frequency, the reflectivity characteristic associated with the filtering element being greater than the output frequency shifts associated with the light source. a light source for generating an optical signal at a particular frequency and a filtering element which is coupled along an optical path to the light source.

The foregoing, and other features and advantages of the present invention, will be apparent from the following description, the accompanying drawings and the appended claims.

DETAILED DESCRIPTION

In accordance with the present invention, an optical apparatus is provided which can be implemented with existing laser diodes to achieve crosstalk-free and frequency stabilized operation. A single filtering element is used for blocking undesired frequency signals as well as providing for frequency locking of the laser transmitter.

Figure 2:
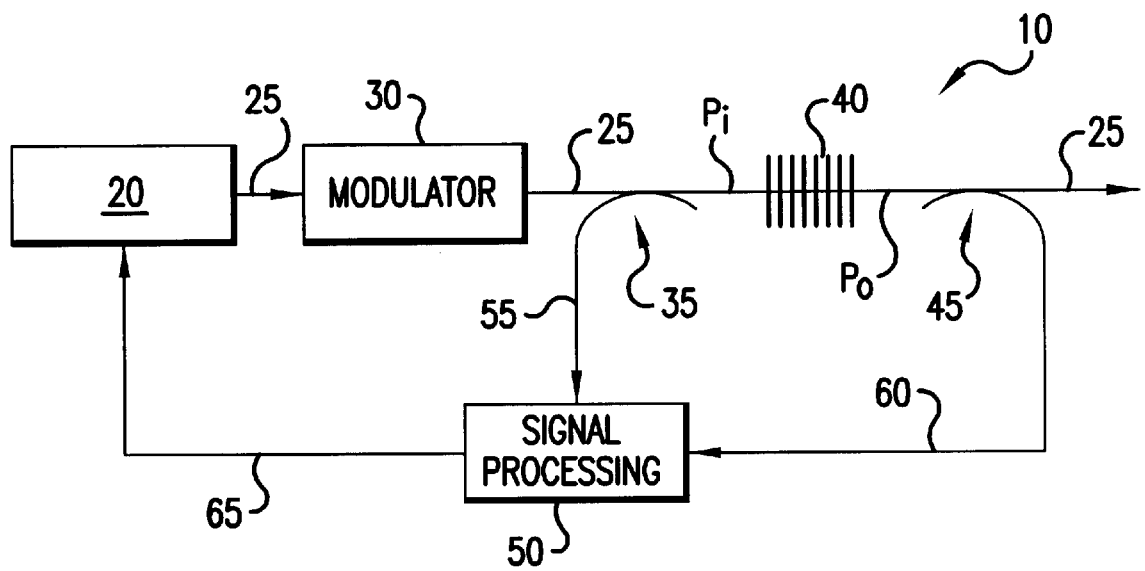
FIG. 2 is a schematic illustration of a frequency stabilized laser source in accordance with the present invention.

FIG. 2 schematically illustrates an optical device 10 in accordance with the present invention wherein transmitter 20 is coupled to the input of external modulator 30 along path 25. Device 10 can be the light source for a particular channel frequency within a WDM or DWDM communication system. Transmitter 20 generates an optical signal having a frequency $v_0$, for example, corresponding to a wavelength in the 1.5 µm range. Transmitter 20 may be a light source in an existing communication system or may be part of a new system installation. Transmitter 20 can be, for example, a DFB semiconductor diode laser, generally comprising one or more III–V semiconductor materials, commercially available. The laser outputs an optical carrier signal at a particular channel wavelength. A laser controller, used with the DFB laser, provides the required laser bias current as well as thermal control of the laser.

External modulator 30 is used to modulate the light having frequency $v_0$ generated by transmitter 20 with information signals. External modulator 30 can be, for example, a Mach-Zehnder modulator employing a waveguiding medium whose refractive index changes according to the applied electrical field, i.e., the refractive index of an electro-optic material such as $LiNbO_3$ can be changed by applying an external voltage. In a Mach-Zehnder external modulator, two optical interferometer paths are provided where an incoming optical carrier is split between the two paths. In the absence of an external voltage, the optical fields in the two paths constructively interfere. When an external voltage is applied, the refractive index of one of the paths induces a phase shift that produces destructive interference.

A filtering element 40 is coupled along path 25 and is configured to transmit the desired signal wavelength and reflect wavelengths outside the transmission band. Filtering element 40 can be, for example, an in-line fiber Bragg grating comprising a series of photoinduced refractive index perturbations in an optical fiber which reflects optical signals within a selected wavelength band and transmits wavelengths outside of the selected wavelength band. The signals having a frequency outside $v_0$ are reflected back to tap 35. Tap 35 can be, for example a 95/5 tap which supplies the undesired reflected signals from grating 40 to signal processing or control circuit 50 by way of line 55. Tap 45 is coupled along path 25 to filtering element 40 and receives the desired signal within the $v_0$ frequency band. Tap 45 can also be a 95/5 tap used to collect 5% of the desired signal and supply it to processing circuitry 50 by way of line 60. Processing circuitry 50 is coupled to transmitter 20 via optical path 65 and utilizes the signals received via lines 55 and 60 to control the output of transmitter 20. In particular, these signals are used to adjust a thermoelectric cooler (not shown) to lock the output frequency of transmitter 20 as well as for adjusting the bias current supplied to transmitter 20 for constant output current.

Alternatively, external modulator 30 may be positioned after filtering element 40 along path 25 in which case a polarization mode fiber with a Bragg grating may be needed to match the polarization of the signal generated by transmitter 20 to that of external modulator 30.

Figure 3:
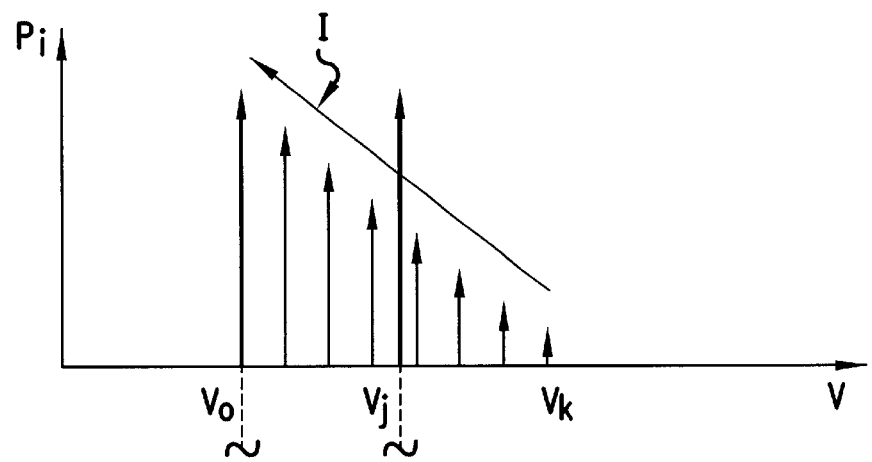
FIG. 3 illustrates an exemplary spectrum of the output power vs. frequency of a transmitter in accordance with the present invention.

FIG. 3 illustrates an exemplary spectrum of the output power vs. frequency of transmitter 20 during operation to the desired operating frequency $v_0$ taken at point $P_i$ of device 10. FIG. 3 also shows the output power of an adjacent channel within the communication system having frequency $v_j$ generated by another light source which may or may not have a similar configuration to device 10. As can be seen, when the injection current applied to transmitter 20 increases, as referenced by curve I, the output power of the transmitter increases while the lasing frequency drops from its approximate initial value $v_k$ to its desired operating frequency $v_0$. During this frequency transition, transmitter 20 generates an optical signal having a frequency within the adjacent channel frequency $v_j$ resulting in crosstalk associated with that channel.

Figure 1:
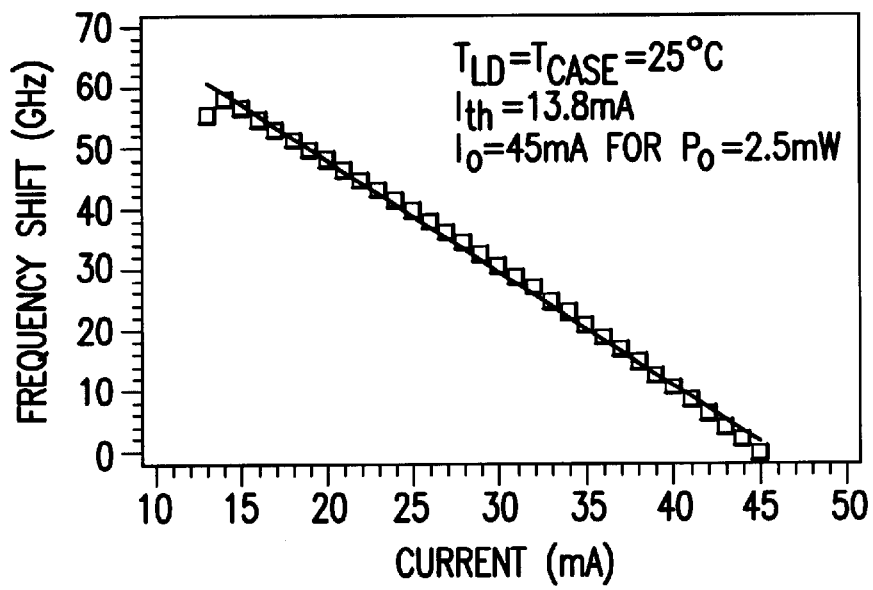
FIG. 1 is a plot of the frequency variation of a DFB laser as a function of the bias current.
Figure 4:
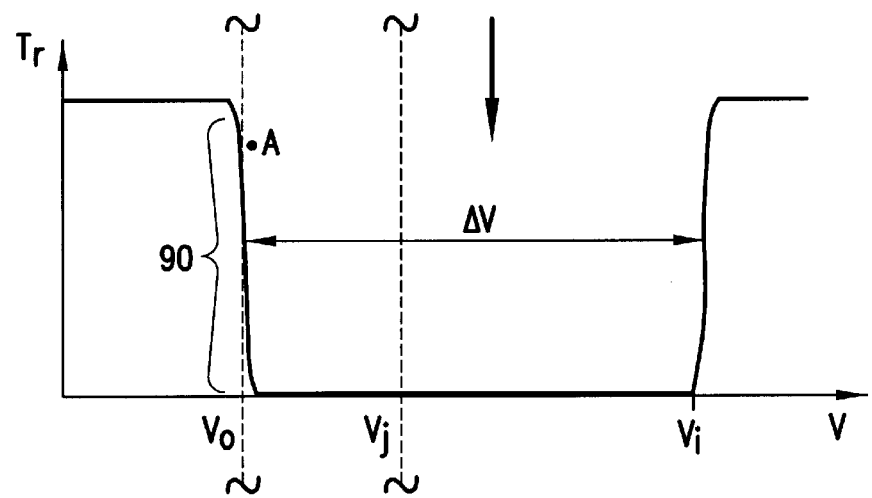
FIG. 4 illustrates the transmittance vs. frequency spectrum of an exemplary filtering element in accordance with the present invention.

The transmittance vs. frequency spectrum of an exemplary filtering element 40 in accordance with the present invention is shown in FIG. 4. As can be seen from the transmission curve, filtering element 40 is configured to have a high transmission characteristic for signals having a frequency of $v_0$ and a low transmission characteristic for frequencies in the $\Delta v$ bandwidth. Filtering element 40 is used as a low-pass filter associated with transmitter 20 to block or reflect the signals having frequency values outside the desired operating frequency $v_0$. Filtering element 40 is configured such that the full width half maximum reflectivity bandwidth $\Delta v$ is wider than the maximum frequency variation of laser transmitter 40 which is also larger than the channel spacing in the WDM system. For example, with reference to the values associated with FIG. 1 where the frequency variation was 58 GHz, the reflectivity bandwidth $\Delta v$ must be greater than 58 GHz. Typical values for maximum frequency variation are 70 GHz for a ridge-waveguide laser, and 25 GHz for a BH (buried heterostructure) laser. Since the normalized bandwidth $(\Delta \lambda / \lambda)$ of a fiber grating can be manufactured between $10^{-4}$ by varying the induced index change and grating length, the required bandwidth $\Delta v$ can be easily obtained using a Bragg grating.

Figure 5:
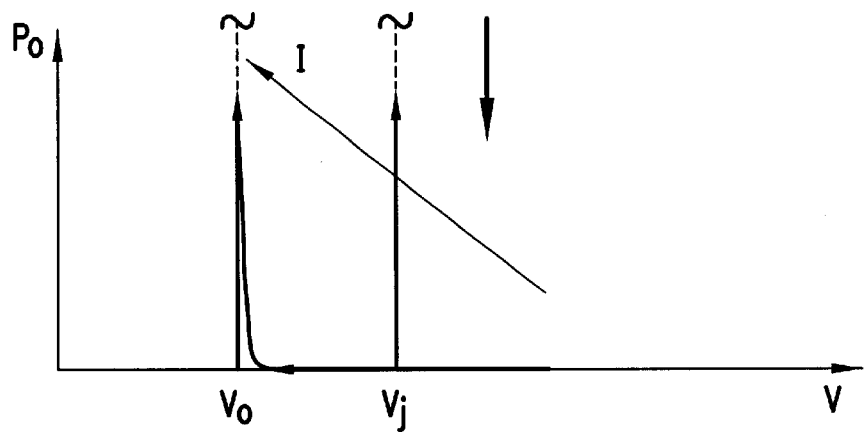
FIG. 5 illustrates the output power vs. frequency of a device as a result of using a filtering element in accordance with the present invention.

FIG. 5 illustrates the output power vs. frequency spectrum taken at point $P_0$ of device 10. As a result of using filtering element 40 with the above referenced transmission characteristic, cross talk induced by variations in the injection current associated with transmitter 20 is substantially reduced or eliminated. Signals corresponding to the desired operating frequency $v_0$ are allowed to pass through filtering element 40. The signals outside the operating frequency are reflected by filtering element 40.

Once the operating frequency, e.g. $v_0$, of transmitter 20 is obtained, the laser needs to be locked preferably at an inflection point referenced by point A in FIG. 4. To lock laser transmitter 20 at the desired frequency, a portion of the reflected signal from filtering element 40 is supplied to signal processing circuitry 50 by way of tap 35 and line 55. Similarly, a portion of the transmitted signal is supplied to signal processing circuitry via tap 45 and line 60. Signal processing circuitry includes photodetectors for receiving the reflected and transmitted optical signals via lines 55 and 60 respectively. The photodetectors generate electrical signals in response to these received optical signals. The electrical signals are supplied to a microprocessor unit which is configured to calculate the second derivative of the reflection spectrum on the low frequency edge, (i.e., the portion of the transmissivity or reflectivity curve 90 closest to frequency $v_0$) of the curve in FIG. 4 associated with filtering element 40 used to lock laser transmitter 20.

Figure 6:
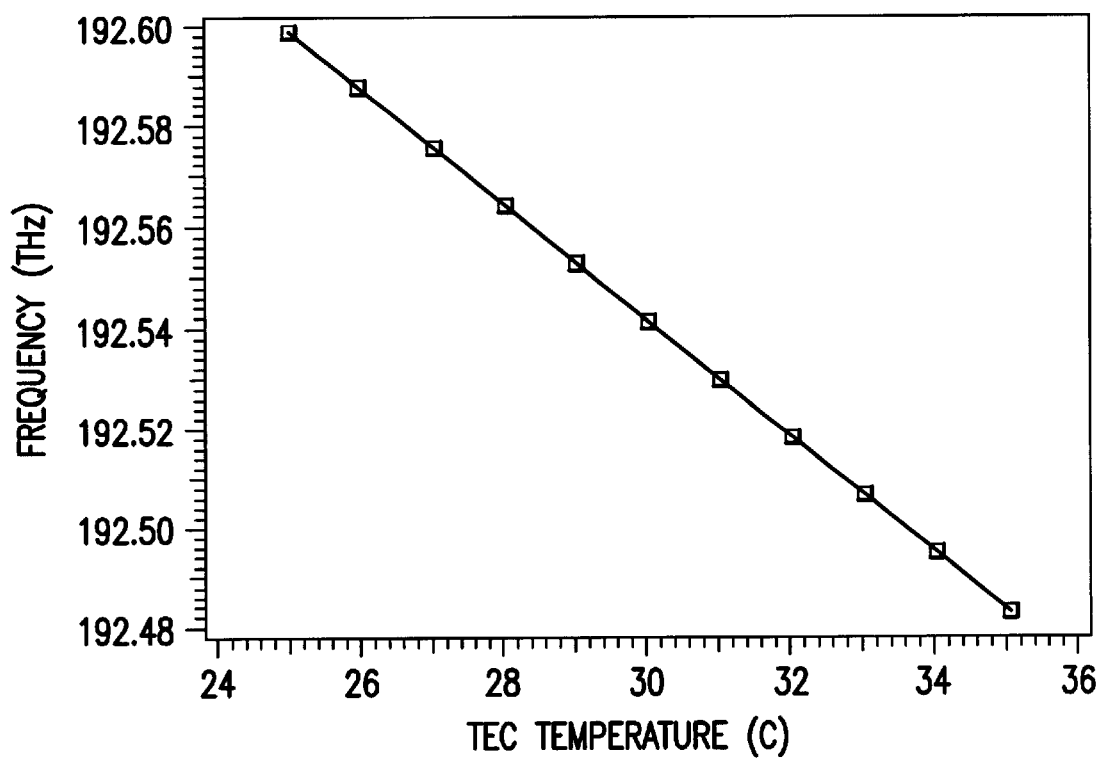
FIG. 6 illustrates a laser frequency variation as a function of an exemplary laser TEC temperature.

The locking procedure first determines the operating temperature $T_0$ associated with the laser transmitter at the desired frequency $v_0$. FIG. 6 illustrates a laser frequency variation as a function of an exemplary laser TEC temperature. The frequency decreases substantially linearly with an increase in temperature. The second derivative of the reflected signal, $d^2R/dv^2$ or its equivalent $d^2R/dT^2$ is evaluated where R represents the reflectivity function at the low frequency edge 90 of the transmission/reflectivity spectrum of filtering element 40 shown in FIG. 4. The temperature of laser transmitter 20 is adjusted to the maximum value of this second derivative $d^2R/dv^2$ of the reflectivity function. The second derivative of the reflectivity function is taken instead of the transmitted portion of the signal for frequency locking because the reflected signal provides larger signal dynamic range, as well as providing a fixed base line reference for signal detection. It should be noted that the second derivative $d^2R/dv^2$ can be evaluated by using the central difference formula: $\delta^2 R_n = R_{n+1} - 2R_n + R_{n-1}$, where n is the number of the particular temperature variation steps, and $R_{n-1}$, $R_n$ and $R_{n+1}$ are the reflectivity values at steps, n−1, n, and n+1, respectively.

Figure 7:
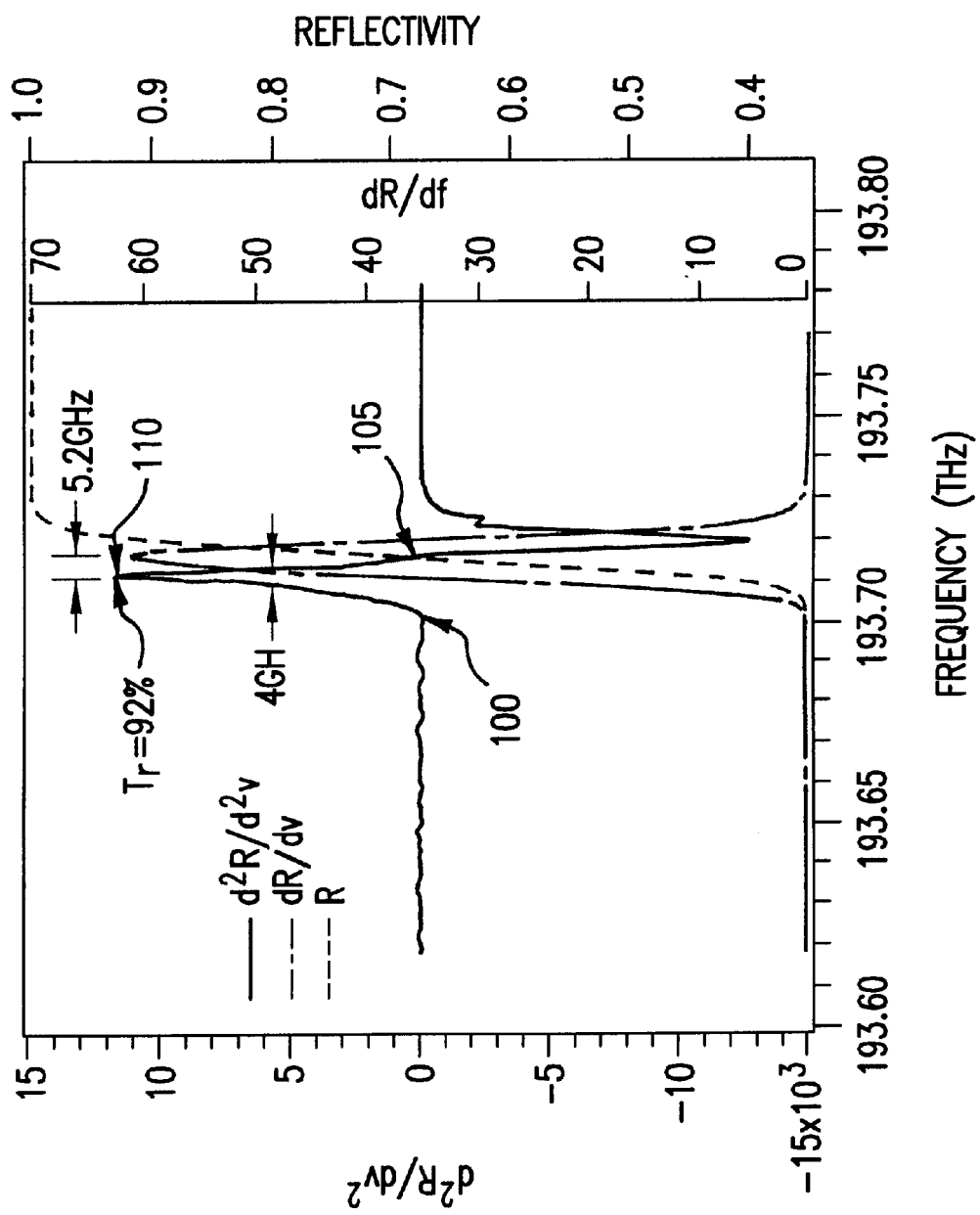
FIG. 7 illustrates the first and second derivatives of an exemplary filtering element reflectivity spectrum in accordance with the present invention.

FIG. 7 illustrates the first and second derivatives of the grating reflectivity spectrum. As can be seen in FIG. 7, the 3 dB bandwidth for the second derivative $d^2R/dv^2$ is approximately 4 GHz while the bandwidth from the first zero point 100 to the second zero point 105 around the peak 110 is approximately 14 GHz. Since the accuracy of TEC temperature control can reach 0.025° C., while a typical frequency tunability for a DFB laser is 12 GH/° C., the frequency tuning step size therefore can be as small as 0.3 GHz. Compared with the wide bandwidth of $d^2R/dv^2$, this small tuning step enables a very tight frequency locking. FIG. 7 also shows the first derivative spectrum dR/dv. The peak separation between the first derivative of the reflectivity function dR/dv and the second derivative of the reflectivity function $d^2R/dv^2$ is 5.2 GHz, which allows the first derivative dR/dv to provide additional locking information for control circuitry 50. Because the grating transmittance at a frequency corresponding to the peak of the second derivative of the reflectivity function $d^2R/dv^2$ is 92% of its maximum value, most of the incoming signal will be transmitted. Thus, by using the second derivative of the reflectivity spectrum, the peak is sharp enough and the bandwidth is wide enough to allow for a tight frequency locking of laser transmitter 20.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. A method for stabilizing the operating frequency of an output signal associated with a light source, said light source having an operating temperature corresponding to said operating frequency, a filtering element coupled to said light source having a reflectivity/transmission spectrum over a range of frequencies, said method comprising the steps calculating a second derivative of said reflectivity spectrum associated with a particular frequency within said range;

determining a maximum value of said second derivative, said maximum value corresponding to said operating frequency; and adjusting said operating temperature of said light source based on said maximum value of said derivative.

2. The method in accordance with claim 1 wherein said reflectivity spectrum includes a low frequency edge, said step of determining a maximum value associated with said particular frequency further comprising the step of calculating said maximum value at said low frequency edge.

3. The method of claim 1, wherein said reflectivity spectrum includes a low frequency edge, said step of determining a maximum value associated with said particular frequency further comprising the step of calculating said maximum value at said low frequency edge.

4. A method for stabilizing the operating frequency of an output signal associated with a light source, said light source having an operating temperature corresponding to said operating frequency, a filtering element coupled to said light source having a reflectivity/transmission spectrum over a range of frequencies, said method comprising the steps of:

calculating a derivative of said reflectivity spectrum associated with a particular frequency within said range;

determining a maximum value of said derivative, said maximum value corresponding to said operating frequency; and adjusting said operating temperature of said light source based on said maximum value of said derivative.

5. An optical device for reducing crosstalk associated with an optical transmitter comprising:

a light source configured to generate a light signal at a particular frequency, said light source having an operating temperature corresponding to said operating frequency;

a filtering element coupled to said light source along an optical path, said filtering element having a reflectivity/transmission spectrum over a range of frequencies;

a control circuit coupled to said light source and said filtering element, said control circuit being configured to determine a derivative of said reflectivity spectrum associated with a particular frequency within said range, determine a maximum value of said derivative, said maximum value corresponding to said operating frequency, and adjust said operating temperature of said light source based on said maximum value of said derivative.

6. An optical device in accordance with claim 5, wherein said filtering element includes an in-fiber Bragg grating.

7. An optical device in accordance with claim 5, further comprising a splitting element coupled to said filtering element along said optical path, said splitting element configured to tap said first portion of said optical signal.

8. An optical device in accordance with claim 5, wherein said optical source includes a distributed feedback laser.

* * * * *